United States Patent [19]

Pidsosny et al.

[11] Patent Number: 4,905,200

[45] Date of Patent: Feb. 27, 1990

[54] APPARATUS AND METHOD FOR CORRECTING MICROCOMPUTER SOFTWARE ERRORS

[75] Inventors: Richard A. Pidsosny, Canton; Michael J. Burke, Milford, both of Mich.; Mark W. Jarvis, Unionville, Canada

[73] Assignee: Ford Motor Company, Dearborn, Mich.

[21] Appl. No.: 237,468

[22] Filed: Aug. 29, 1988

[51] Int. Cl.$^4$ ............................................. G11C 13/00
[52] U.S. Cl. ..................................... 364/300; 365/201; 365/210; 365/189.07; 365/230.03; 371/11.3; 364/900; 364/944.92
[58] Field of Search ............... 365/200, 201, 202, 210, 365/228, 189.07, 230.03, 230.06; 371/11, 13, 67, 68, 71

[56] References Cited

U.S. PATENT DOCUMENTS

| | | |
|---|---|---|
| 3,748,653 | 7/1973 | Debruyne et al. . |
| 3,934,227 | 1/1976 | Worst . |
| 4,051,461 | 9/1977 | Hashimoto et al. . |
| 4,093,985 | 6/1978 | Das . |
| 4,150,428 | 4/1979 | Inrig et al. . |
| 4,380,066 | 4/1983 | Spencer et al. . |
| 4,450,559 | 5/1984 | Bond et al. . |
| 4,463,450 | 7/1984 | Haeusele . |
| 4,592,024 | 5/1986 | Sakai et al. . |
| 4,750,158 | 6/1988 | Giebel et al. ........................ 365/200 |
| 4,751,703 | 6/1988 | Picon et al. ......................... 365/200 |
| 4,757,475 | 7/1988 | Awaya .............................. 365/200 |

*Primary Examiner*—Terrell W. Fears
*Attorney, Agent, or Firm*—Allan J. Lippa; Peter Abolins

[57] ABSTRACT

An apparatus for replacing an undesired code stored in a plurality of storage locations in read-only memory (ROM) with a replacement code. The replacement code, including a jump-back instruction to readdress the ROM, are programmed into an EEPROM. First and second storage locations store the beginning address of the undesired code and the beginning address of the replacement code, respectively. When the beginning address of the undesired code is generated by a program counter, a comparator generates a transfer signal. In response, the beginning address of the replacement code stored in the second storage location is transferred into the program counter. Each address of the replacement code is then sequenced by the program counter until a central processing unit recognizes the jump-back instruction. The central processing unit then readdresses the ROM in response to the jump-back instruction after the entire replacement code has been executed in place of the undesired code.

21 Claims, 3 Drawing Sheets

APPARATUS AND METHOD FOR CORRECTING MICROCOMPUTER SOFTWARE ERRORS

BACKGROUND OF THE INVENTION

The field of the invention generally relates to substituting algorithms or programs, or portions thereof, stored in read-only memories of microcomputers.

Programs, such as algorithms, executed by microcomputers are typically stored in read-only memories (ROM's). A typical application of a microcomputer is to control the operation of an automobile engine which requires numerous algorithms to control a single engine function such as air/fuel ratio. The algorithms are often complex and may rely on complex modeling of the physical characteristics of a particular engine. Accordingly, it is often found that corrections of algorithms, or substitution of entire algorithms, is needed after the initial ROM is produced. Modifications to the programming of a ROM, however, incur a considerable time delay because new masks must be developed. In some situations, such as when vehicle production is committed, this time delay may be unacceptable. Although erasable and programmable memories are known (such as EPROMS and EEPROMS), their increased size, cost, and lower reliability militates against substituting an EPROM or EEPROM for a ROM.

U.S. Pat. No. 3,748,653 issued to Debruyne et al discloses a computer system which only substitutes a single erroneous line of code in a ROM with a corrected line of code, having the identical number of bits, stored in an erasable memory. Referring to FIGS. 1 and 2, read/write memory WCS contains corrected words for replacing the corresponding erroneous words in memory MP. The word length of memory WCS and MP are identical. Associative memory CAM, comprising a bank of registers, stores the addresses of corrected words in memory WCS. Address register RA simultaneously addresses both associative memory CAM and memory MP. In response, either a word from memory MP or a corrected word from memory WCS is routed through switch MX.

A disadvantage of this approach is that the correction is only a word for word replacement. This may be adequate when an inadvertent and simple program error has been made. However, it may not be suitable when an entire algorithm must be revised. For example, it is highly likely that the new or corrected algorithm may have a different number of words, bytes, or lines of code than the algorithm which is being replaced in which case the approach disclosed in patent '653 is not suitable.

SUMMARY OF THE INVENTION

It is an object of the invention herein to substitute an entire algorithm comprising a number of lines of code stored in a ROM with a new algorithm stored in an electronically programmable memory which may comprise a different number of lines of code.

The above problems and disadvantages are overcome, and object achieved, by the apparatus and method described herein for replacing an undesired code in a ROM with a replacement code in an electronically programmable memory (EPROM or EEPROM), comprising: an electronically programmable memory having a first storage location for storing a beginning address of the undesired code, a second storage location for storing a beginning address of the replacement code, and a plurality of addressable storage locations for storing the preselected code wherein the last of the addressable storage locations stores an instruction for readdressing the ROM; a program counter responsive to a central processing unit for addressing both the ROM and the electronically programmable memory; transfer means coupled to the first and second memory locations and to the program counter for transferring the beginning address of the replacement code to the program counter when the beginning address of the undesired code occurs; and the central processing unit receiving code from the ROM and the electronically programmable memory, the central processing unit recognizing the return instruction for instructing the program counter to address the ROM.

An advantage obtained by the invention described herein is that an entire algorithm stored in a ROM is replaced by an entire algorithm stored in an electronically programmable memory whereas prior approaches were limited to a line-for-line replacement. Another advantage obtained is that a corrected algorithm may be substituted for an erroneous algorithm having a different number of lines of code than the corrected algorithm. Neither of these advantages were obtainable by prior approaches.

The invention will be better understood and further objects and advantages thereof will become more apparent from the following description of a particular example, referred to as "Description of the Preferred Embodiment", with reference to the drawings.

DESCRIPTION OF THE PREFERRED EMBODIMENT

Figure 1:
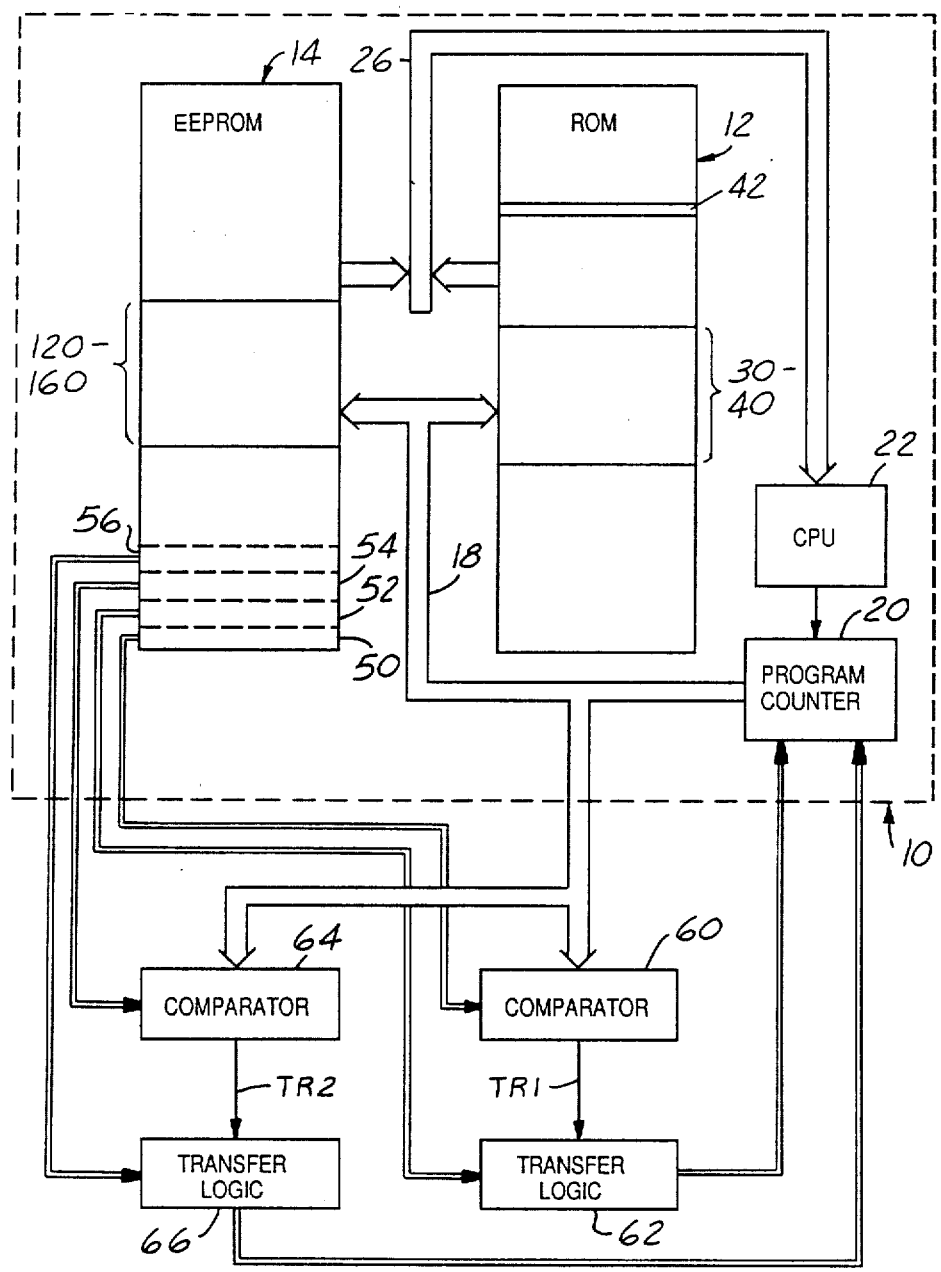
FIG. 1 is a block diagram of an embodiment in which the invention is used to advantage.

With reference to FIG. 1, in general terms, microcomputer 10 is shown including read-only memory (ROM) 12, a masked read-only memory in this example, and erasable/programmable memory 14, an electronically erasable/programmable memory (EEPROM) in this example. Both ROM 12 and EEPROM 14 are addressed via address bus 18 by algorithm counter 20 under control of central processing unit (CPU) 22. Stored information is coupled to CPU 22 from ROM 12 and EEPROM 14 via data bus 26.

In a typical application of microcomputer 10, such as for controlling a motor vehicle engine, numerous software algorithms and data are stored in ROM 12. Each algorithm is stored as a number of lines of code (e.g., instructions) wherein each line of code is represented by a binary word at a particular memory location. The binary word in a particular memory location is coupled to data bus 26 when that location is addressed on address bus 18.

EEPROM 14 contains information such as, for example, calibration algorithms. Information is retrieved from EEPROM 14 in the same manner as ROM 12. Unlike ROM 12, information is electronically programmed into EEPROM 14 by a technician such as when entering calibration constants.

When executing a particular software algorithm such as, for example, air/fuel ratio control, CPU 22 instructs program counter 20 to sequence the addresses of memory locations in ROM 12 storing lines of code for executing that particular algorithm.

An example is now provided of how to susbstitute any algorithm stored in ROM 12 with a replacement code of any desired length. For purposes of this example, memory locations 30 through 40 represent the lines of undesired code in ROM 12 which are to be replaced. Memory location 42 represents the next line of code which is to be addressed after the replacement code is executed. Stated another way, memory location 42 represents the next memory location that would have been addressed if the algorithm stored in memory locations 30 through 40 was executed.

Memory locations 120 through 160 represent the lines of replacement code in EEPROM 14 wherein the last memory location (160) contains a jump-back instruction to the address of memory location 42 in ROM 12. It is noted that the number of lines of undesired code and replacement code, and their positions in the memory, are irrelevant for the purposes of the invention described herein.

The address of the first line of code to be replaced (i.e., the address of memory location 30 in this example) is shown stored in memory location 50 of EEPROM 14. The address of the first line of replacement code (i.e., the address of memory location 120 in this example) is shown stored in memory location 52 of EEPROM 14. In this example, memory locations 54 and 56 store the respective addresses for the first line of undesired code and first line of replacement code for a second algorithm to be replaced. It is noted that any number of algorithms may be replaced dependent on the memory availability of EEPROM 12. For purposes of the example presented herein, the Figure illustrates a structure for replacing two algorithms.

Comparator 60, a conventional logic gate comparator, is shown coupled to address bus 18 and memory location 50. When the address on address bus 18 is identical to the address stored in memory location 50, comparator 60 provides transfer signal TR1. Transfer logic 62, responsive to signal TR1, is shown having an input coupled to memory location 52 and an output coupled to a parallel input of program counter 20. In response to signal TR1 from comparator 60, transfer logic 62 loads the address stored in storage location 52 into program counter 20. Similarly, comparator 64 is shown coupled to address bus 18 and memory location 54 for generating transfer signal TR2. Transfer logic 66, responsive to transfer signal TR2, is shown coupled between memory location 56 and program counter 20. When the address on address bus 18 is identical to the address stored in memory location 54, the address in memory location 56 is loaded into Program counter 20 by operation of comparator 64 and transfer logic 66. Memory locations 50, 52, 54, and 56 are always available to comparator 60, transfer logic 62, comparator 64, and transfer logic 66, respectively. Stated another way, these memory locations do not require addressing. It is noted that the invention may be used to advantage in an embodiment wherein memory locations 50, 52, 54, and 56 are separate from EEPROM 14.

An example of the operation for replacing a single algorithm (memory locations 30 through 40) stored in ROM 12 with a replacement algorithm (memory locations 120 through 160) stored in EEPROM 14 is now described. Program counter 20, under control of CPU 22, addresses ROM 12 via address bus 18 for providing information stored therein to CPU 22 via data bus 26. Comparator 60 compares the addresses provided by program counter 20 to the stored address (memory location 50) of a first line of predetermined or undesired code (memory location 30). When the address comparison is positive, comparator 60 generates transfer signal TR1. In response, transfer logic 62 loads the stored address (memory location 52) of the first line of replacement code (memory location 120) into program counter 20. Accordingly, the first line of replacement code (memory location 120) is presented on data bus 26 in place of the first line of undesired code (memory location 30). Program counter 20 then sequentially increments addresses thereby accessing subsequent memory locations of EEPROM 14 storing the remaining lines of the replacement code. Stated another way, succeeding lines of code in the replacement program are provided on data bus 26 to CPU 22. Program counter 20 continues to sequence addresses until CPU 22 recognizes the jump-back instruction stored in the last line of the replacement program (memory location 160 in this example). In response, CPU 22 instructs program counter 20 to readdress ROM 12 (i.e., address memory location 42 of ROM 12 in this example). Thus, after the replacement algorithm stored in EEPROM 14 is executed by CPU 22, operation of microcomputer 10 continues on in the same manner as if the original algorithm were executed.

An advantage of the embodiment described above is that any size replacement algorithm (within limitations of the EEPROM memory) may be substituted for any size of undesired algorithm stored in ROM 12. This is particularly advantageous when major modifications, or a whole new approach, to an algorithm are desired. Another advantage is that more than one algorithm may be replaced. Of course, simple errors in programming or data entry may also be corrected.

It is also noted that the invention may be used to modify presently used microcomputers. For example, the description provided hereinabove is applicable to modify a single chip computer sold by Motorola Inc. under Part No. MC68HC11A8. For that particular microcomputer, ROM 12 has 8K bytes of storage, each byte having eight bites. EEPROM 14 has 512 bytes, each eight bites long. The microcomputer has a 16 bit address wherein address bus 18 has 16 lines, eight of which are also used as data bus 26. Since the address is 16 bites, and each line or byte of EEPROM 14 is eight bites, storage locations 50, 52, 54 and 56 each include two lines of storage. It is apparent from the description of the preferred embodiment presented hereinabove that simple modification of presently used microcomputers, such as the Motorola microcomputer, will provide the advantage of algorithm substitution.

Figure 2:
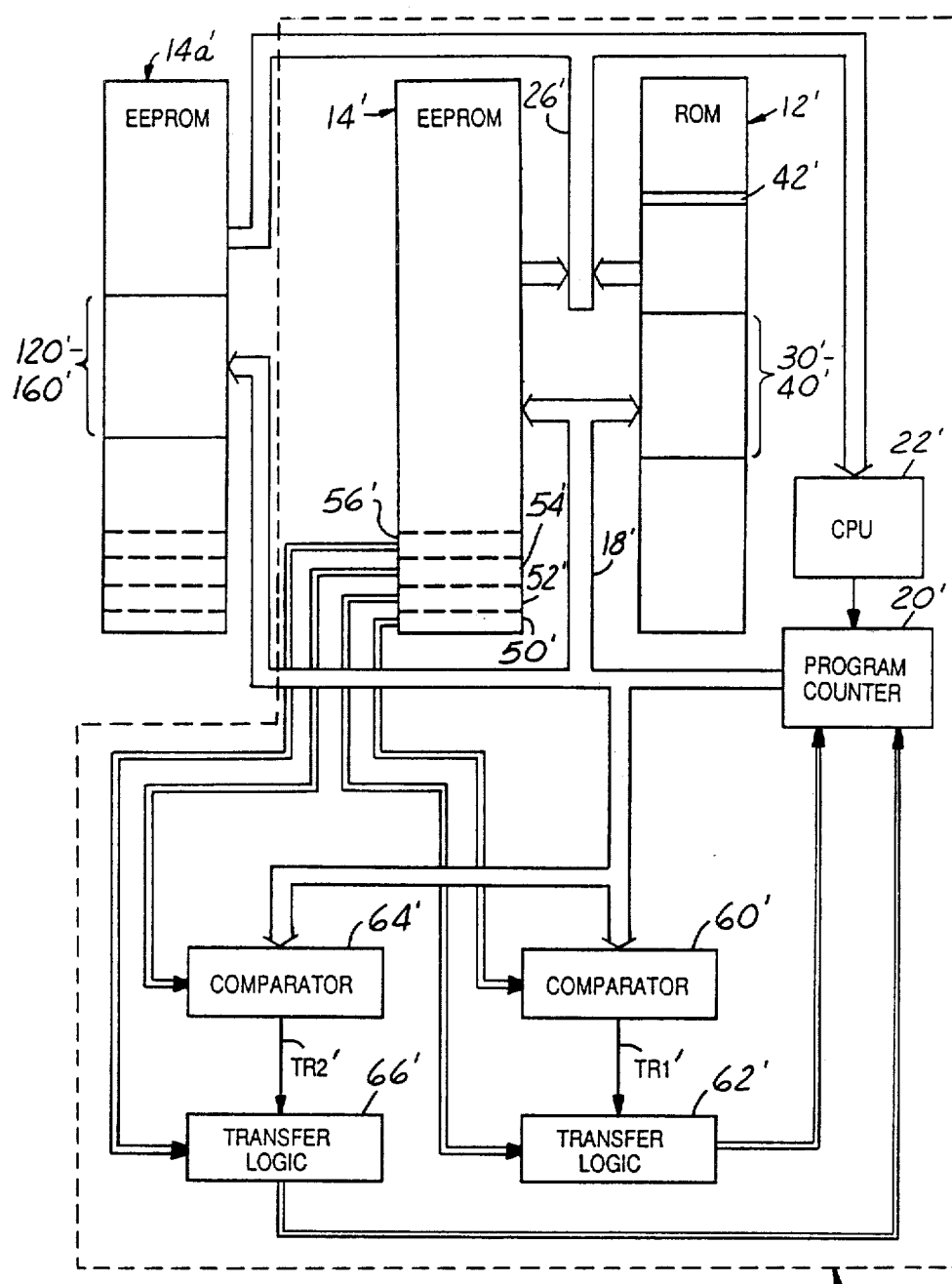
FIG. 2 is a block diagram of an alternate embodiment in which the invention is used to advantage.

An alternate embodiment is shown in FIG. 2 wherein like numerals refer to like components of the preferred embodiment shown in FIG. 1. An additional EEPROM 14a' is shown in a remote location from microcomputer 10'. That is, EEPROM 14a' is on a separate chip from EEPROM 14', ROM 12', CPU 22', and program counter 20'. It is also noted that in this example microcomputer 10' includes comparators 60' and 64' and transfer logic 62' and 66'. EEPROM 14a' is shown containing the replacement algorithm in storage locations 120'-160'. These and other storage locations are addressed via address bus 18' and information contained therein communicated via data bus 26' in a manner similar to that described previously herein with particular reference to FIG. 1. However, storage locations 50', 52', 54', and 56' remaine positioned in EEPROM 14'.

In operation, the alternate embodiment shown in FIG. 2 operates in a similar manner to the preferred embodiment described with reference to FIG. 1 except that the replacement algorithm is retrieved from EEPROM 14a'. This configuration is particularly suited to situations wherein the storage availability of EEPROM 14' on microcomputer 10' is limited.

Figure 3:
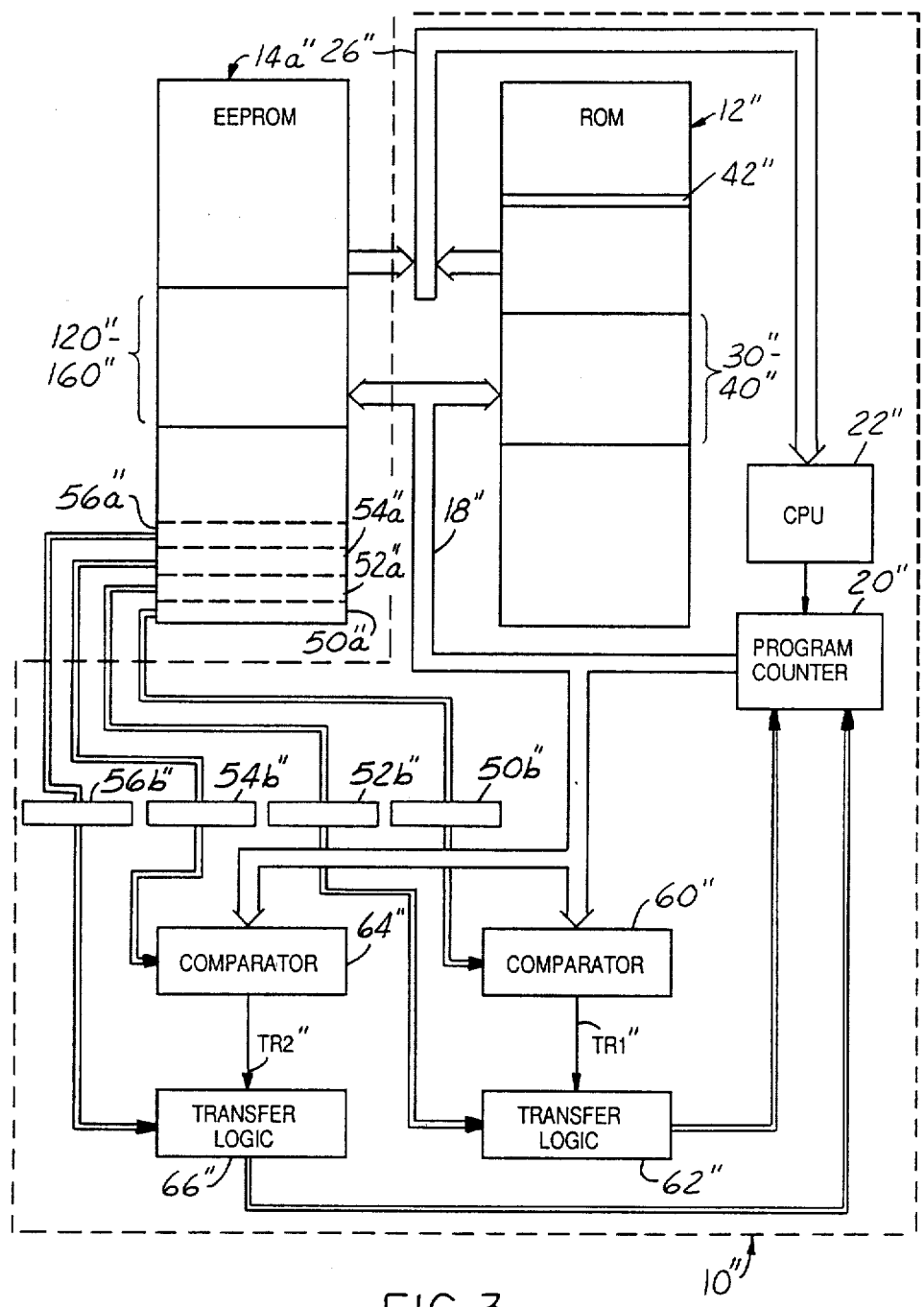
FIG. 3 is a block diagram of another alternate embodiment in which the invention is used to advantage.

Another alternate embodiment is shown in FIG. 3 wherein like numerals refer to like components shown in FIG. 1 with respect to the preferred embodiment. EEPROM 14a" is here shown on a separate chip from microcomputer 10". EEPROM 14a" is shown coupled to address bus 18" and data bus 26". Storage locations 50a", 52a", and 56a" are shown coupled in this example to volatile storage devices (storage registers in this example), 50b", 52b", 54b", and 56b",respectively, located within microcomputer 10".

In operation, when microcomputer 10" is first powered up, the address information stored in EEPROM 14a" (in storage locations 50a", 52a", 54a", and 56a") is transferred to the volatile storage registers (50b", 52b", 54b", and 56b") located in microcomputer 10". Thereafter, the operation of the alternate embodiment shown in FIG. 3 is essentially the same as the operation previously described herein with respect to the preferred embodiment shown in FIG. 1.

This concludes the description of the preferred embodiment. The reading of it by those skilled in the art will bring to mind many alterations and modifications without departing from the spirit and scope of the invention. For example, the invention may be used to advantage with any apparatus having a masked read-only memory storing an algorithm, or data, which the designer desires to replace. Accordingly, it is intended that the scope of the invention be limited only by the following claims.

What is claimed:

1. An apparatus for replacing an undesired code stored in a read-only memory (ROM) with a replacement ode, comprising:
    at least one electronically programmable memory having a first storage location for storing a beginning address of the undesired code, a second storage location for storing a beginning address of the replacement code, and a plurality of addressable storage locations for storing said replacement code, wherein the last of said addressable storage locations stores a code for readdressing said ROM;
    control means for addressing and receiving code from both said ROM and said electronically programmable memory;
    transfer means coupled to said first and second memory locations and to said control means for transferring said beginning address of said replacement code to said control means when said beginning address of said undesired code occurs; and
    said control means addressing said ROM after recognizing said code for readdressing said ROM.

2. The apparatus recited in claim 1 wherein said ROM, said electronically programmable memory, and said control means comprise a microcomputer for executing algorithms.

3. The apparatus recited in claim 2 wherein said ROM stores said algorithms for execution by said microcomputer.

4. The apparatus recited in claim 3 wherein said microcomputer controls a motor vehicle engine.

5. An apparatus for replacing an undesired code stored in a read-only memory (ROM) with a replacement code, comprising:
    an electronically programmable memory having a first storage location for storing a beginning address of the undesired code, a second storage location for storing a beginning address of the replacement code, and a plurality of addressable storage locations for storing the replacement code wherein the last of said addressable storage locations stores an instruction for readdressing said ROM;
    addressing means for addressing both said ROM and said electronically programmable memory;
    transfer means coupled to said first and second memory locations and to said addressing means for transferring said beginning address of the replacement code to said addressing means when said beginning address of said undesired code is generated by said addressing means; and
    a central processing unit receiving code from said ROM and said electronically programmable memory, said central processing unit instructing said addressing means to address said ROM when said instruction for readdressing said ROM is recognized.

6. The apparatus recited in claim 5 further comprising an address bus connected to said addressing means and said ROM and said electronically programmable memory.

7. The apparatus recited in claim 6 further comprising a data bus connected to said ROM, said electronically programmable memory, and said central processing unit.

8. The apparatus recited in claim 7 wherein said data bus is multiplexed with a portion of said address bus.

9. An apparatus for replacing an undesired code stored in a plurality of storage locations in read-only memory (ROM) with a replacement code, comprising:
    an electronically programmable memory having a first storage location for storing a beginning address of the undesired code, a second storage location for storing a beginning address of the replacement code, and a plurality of addressable storage locations for storing the replacement code wherein the last of said addressable storage locations stores a return instruction for readdressing said ROM;
    a program counter responsive to a central processing unit for addressing both said ROM and said electronically programmable memory;
    a comparator coupled to said first storage location and said program counter for detecting said beginning address of said undesired code;
    transfer logic responsive to said comparator and coupled to both said electronically programmable memory and said program counter for transferring said beginning address of said replacement code to said program counter;
    said program counter sequencing addresses through said plurality of addressable storage locations in said electronically programmable memory; and
    said central processing unit receiving code from said ROM and said electronically programmable memory, said central processing unit recognizing said return address for instructing said program counter to address said ROM after said replacement code has replaced said undesired code.

10. The apparatus recited in claim 9 wherein said central processing unit executes algorithms.

11. The apparatus recited in claim 10 wherein said ROM stores said algorithms to be executed by said central processing unit.

12. The apparatus recited in claim 11 wherein said undesired code represents said algorithm.

13. The apparatus recited in claim 12 wherein said replacement code represents another algorithm.

14. The apparatus recited in claim 13 wherein said ROM stores data.

15. The apparatus recited in claim 14 wherein said undesired code represents said data stored in said ROM.

16. The apparatus recited in claim 15 wherein said replacement code represents data stored in said electronically programmable memory.

17. An apparatus for replacing an undesired code stored in a plurality of storage locations in read-only memory (ROM) with a replacement code, comprising:
 a first storage location for storing a beginning address of the undesired code;
 a second storage location for storing a beginning address of the replacement code;
 an electronically programmable memory having a plurality of addressable storage locations for storing the replacement code wherein the last of said addressable storage locations stores a jump-back instruction for readdressing said ROM;
 a program counter responsive to a central processing unit for addressing both said ROM and said electronically programmable memory;
 a comparator coupled to said first storage location and said program counter for detecting said beginning address of the undesired code;
 transfer logic responsive to said comparator and coupled to both said second storage location and said program counter for transferring said beginning address of the replacement code to said program counter;
 said program counter sequencing addresses through said plurality of addressable storage locations in said electronically programmable memory; and
 said central processing unit receiving code from said ROM and said electronically programmable memory, said central processing unit recognizing said jump-back instruction for instructing said program counter to address said ROM after said replacement code has replaced said undesired code.

18. The apparatus recited in claim 17 wherein said first storage location and said second storage location are positioned in a second electronically programmable memory separate from said electroncially programmable memory for storing the replacement code.

19. The apparatus recited in claim 17 wherein said first storage location and said second storage location are positioned in said electronically programmable memory for storing the replacement code.

20. The apparatus recited in claim 17 wherein said electronically programmable memory for storing the replacement code further comprises a third storage location for storing said beginning address of the undesired code and a fourth storage location for storing said beginning address of the replacement code, and wherein said first storage location is coupled to said third storage location for receiving said beginning address of the undesired code and said second storage location is coupled to said fourth storage location for receiving said beginning address of the replacement code.

21. A method for replacing an undesired code stored in a plurality of storage locations in a read-only memory (ROM) with a replacement code, comprising the steps of:
 storing a beginning address of the undesired code;
 storing a beginning address of the replacement code;
 storing the replacement code in a plurality of addressable storage locations in an electronically programmable memory wherein the last of said addressable storage locations stores a jump-back instruction for readdressing said ROM;
 addressing said ROM by a program counter responsive to a central processing unit;
 generating a transfer instruction when the address provided by said program counter compares to the stored address of the beginning location of the undesired code;
 transferring the stored beginning address of said replacement code to said program counter in response to said transfer instruction;
 sequencing addresses through said plurality of addressable storage locations in said electronically programmable memory by said program counter; and
 coupling said replacement code to a central processing unit for recognizing said jump-back instruction and readdressing said ROM after said replacement code has replaced said undesired code.

* * * * *